(12) United States Patent
Burks et al.

(10) Patent No.: US 9,358,623 B2
(45) Date of Patent: Jun. 7, 2016

(54) HOLE CUTTING SYSTEM

(71) Applicants: William Larry Burks, Waxahachie, TX (US); Perry G. Wester, Midlothian, TX (US); Gary Estes, Waxahachie, TX (US)

(72) Inventors: William Larry Burks, Waxahachie, TX (US); Perry G. Wester, Midlothian, TX (US); Gary Estes, Waxahachie, TX (US)

( * ) Notice: Subject to any disclaimer, the term of this patent is extended or adjusted under 35 U.S.C. 154(b) by 116 days.

(21) Appl. No.: 13/895,447

(22) Filed: May 16, 2013

(65) Prior Publication Data
US 2014/0338513 A1    Nov. 20, 2014

(51) Int. Cl.
*B26D 5/00* (2006.01)
*B26B 21/12* (2006.01)
*B23D 49/11* (2006.01)
*B23D 49/00* (2006.01)

(52) U.S. Cl.
CPC .............. *B23D 49/11* (2013.01); *B23D 49/003* (2013.01); *Y10T 83/68* (2015.04)

(58) Field of Classification Search
CPC .... B23D 49/11; B23D 49/003; B23D 49/002; Y10T 83/68

USPC .................. 30/360, 361, 500, 178, 353, 305; 174/58; 83/745
See application file for complete search history.

(56) References Cited

U.S. PATENT DOCUMENTS

| | | | | |
|---|---|---|---|---|
| 3,375,616 | A * | 4/1968 | Scott et al. ..................... | 451/356 |
| 4,087,913 | A * | 5/1978 | Jackson .......................... | 30/360 |
| 4,744,177 | A * | 5/1988 | Braun et al. .................... | 451/357 |
| 4,969,269 | A * | 11/1990 | Dominguez ..................... | 30/360 |
| 5,048,190 | A * | 9/1991 | Aurness et al. ................. | 30/299 |
| 5,797,189 | A * | 8/1998 | Gilbert ............................ | 30/500 |
| 5,867,913 | A * | 2/1999 | Pettigrew ........................ | 30/500 |
| 6,094,826 | A * | 8/2000 | Schmidt .......................... | 30/369 |
| 6,403,883 | B1 * | 6/2002 | Morgan et al. .................. | 174/58 |
| 6,681,756 | B1 * | 1/2004 | Kilpatrick ........................ | 125/41 |
| 2008/0149360 | A1 * | 6/2008 | Dinh et al. ....................... | 174/58 |

* cited by examiner

*Primary Examiner* — Omar Flores Sanchez
(74) *Attorney, Agent, or Firm* — Jeffrey Roddy

(57) ABSTRACT

A material removal system enabling the installation of electrical outlet boxes and junction boxes among others, includes a platen for attaching to a vibrating movement, a blade with teeth having any circular or non-circular cutting edge which attaches to the platen that vibrates the teeth multidirectionally. The system enables rapid material removal and produces a clean rectangular aperture requiring little or no modification prior to installing an outlet box.

5 Claims, 8 Drawing Sheets

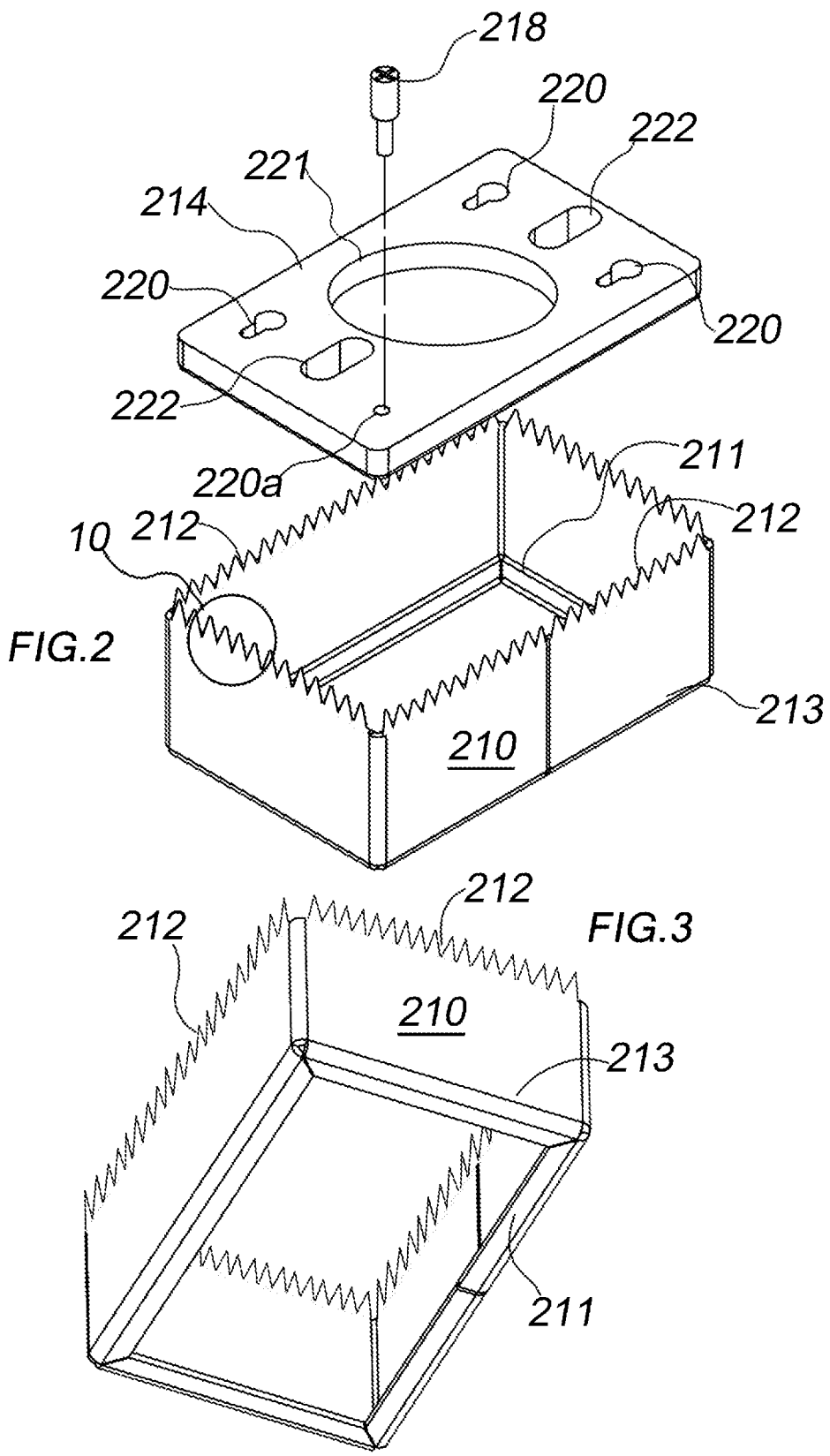

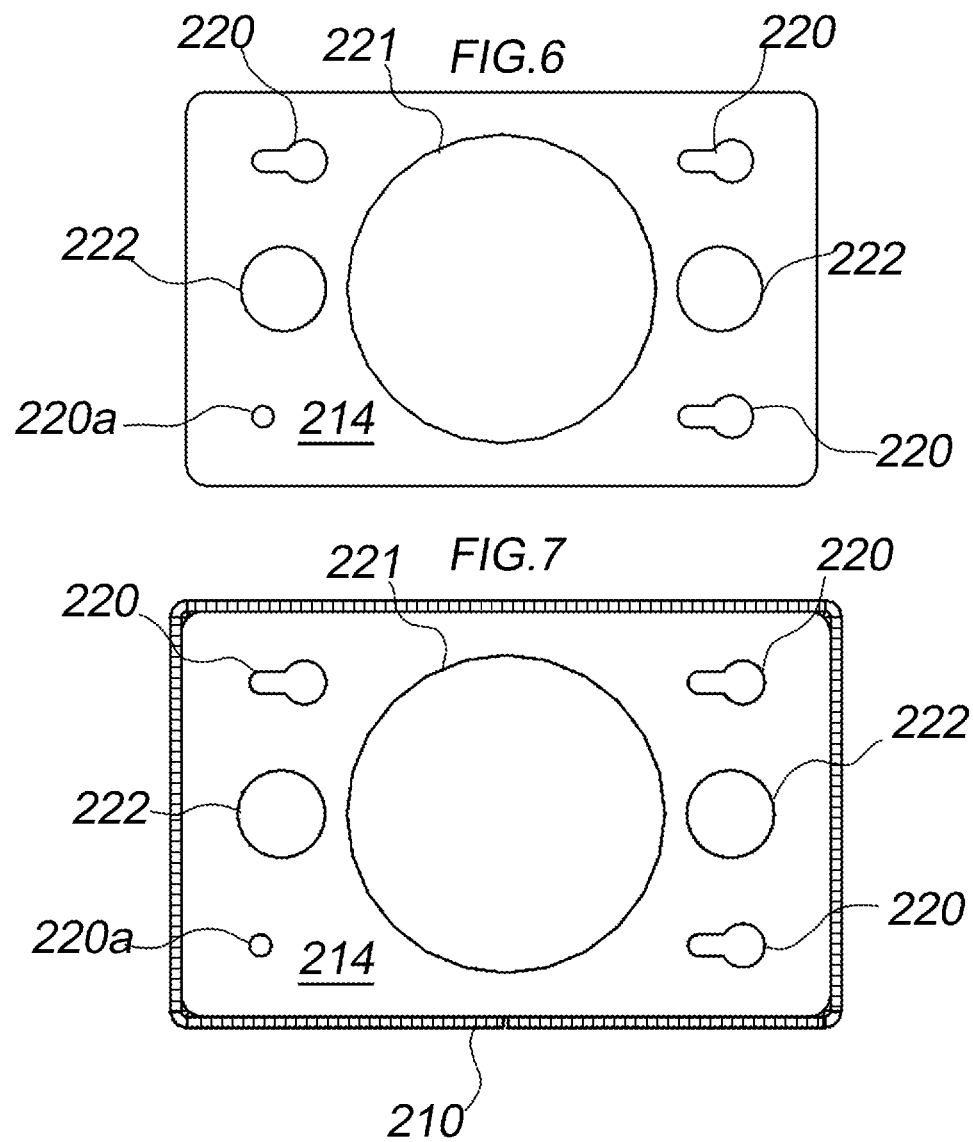

HOLE CUTTING SYSTEM

FIELD

The present invention relates generally to hole cutting methods and devices for producing an aperture of a shape and size to receive electrical outlet boxes, junction boxes and other inserts.

BACKGROUND

Outlet boxes are installed typically in drywall or other sheet material, at the time of manufacturing, construction or for remodeling purposes. While determining a cut-out position in drywall for an outlet box is a simple matter during new construction owing to the visibility of the studs and the outlet box itself which is typically affixed to a stud, a number of problems present themselves when installing junction boxes in a remodeling scenarios. While drywall, prior to mounting on studs, can be marked and cut with a saw or utility knife from both sides, once mounted to studs, installation of an outlet box is limited to cutting through the outer facing surface of the drywall which increases the likelihood of a misplaced cut and an irregular aperture that must be repaired before or after insertion of the junction box, causing time loss for a contractor manufacturer or homeowner. Several devices have been described for cutting rectangular holes in drywall in order to mount electrical junction boxes. U.S. Pat. No. 5,797,189 to Gilbert describes a tool for cutting rectangular holes in drywall for new construction that uses a template with guide pins that are inserted into the pre-threaded apertures of electrical outlets and junction boxes in order to properly position and guide the cutting tool. U.S. Pat. No. 5,048,190 to Aurness et al., describes a tool that is chucked to a hand drill for cutting rectangular holes in drywall. While the foregoing devices are no doubt useful for their intended use, multi-bladed configuration introduces complexity and when mounted to a drill, and requires that the user manipulate a device having considerable distance between the power switch or handhold and the cutting edge which reduces control over the material removal process. It would be desirable to provide a motorized means of cutting holes for the installation of electrical outlet and junction boxes that would remove a single portion of material defining an aperture for an outlet box, junction box or other insert. It would also be desirable to produce an aperture possessing clean corners that require no additional modification of the aperture; for example, additional sawing or sanding, which is required with past hole cutting systems. Moreover, it would be desirable for the foregoing tool to be shaped and sized for easy manipulation and control over the cut.

SUMMARY

The present invention relates generally to a system for cutting holes in a material such as drywall or any other construction material for the placement and installation of electrical outlet, junction boxes and other regular and irregularly shaped inserts of various types, and includes a powered blade having a cutting edge without gaps at the corners that produces a circular or non-circular aperture with clean corners that requires little or no additional modification; e.g., clean out or additional trimming prior to box installation. It should be noted that while particular embodiments depicted in this disclosure have a rectangular blade, any circular or non-circular shape can be used, for example, hexagons, octagons and rectangles with rounded corners. It should be noted that while the particular embodiments depicted in this disclosure have a rapid elliptical movement and variable speed RPM, other oscillating or vibratory movement is conceivable. Preferably, the RPM can range from 500-15,000. Also, the blade can possess contiguous teeth, or the teeth can have a slight gap at the corners or bends of the blade of whatever profile or shape. Whatever the shape of the cut, the powered blade agitates serrated teeth through the material being cut. At least one guide pin which is stationary relative to the motorized blade, transfers movement to the blade and stabilizes the cutting edge as it is plunged into the material. Regarding the oscillating movement, those having skill in the art will appreciate that there have been described a number elliptical or orbital movements in the field of sheet sanders. U.S. Pat. No. 3,375,616 to Scott et al., and U.S. Pat. No. 4,744,177 to Braun et al. are incorporated by reference herein. Other devices such as personal massagers possess similar elliptical and or orbital movements. Mechanical movements used in the forgoing, as well as others can be used to produce a multidirectional and/or vibrating movement suitable for use with the present invention.

In one aspect of the present invention, a cutting assembly includes a replacement platen for a tool such as a motorized sheet sander, and a blade assembly which is attachable to the replacement platen. The ability to retrofit to existing sheet sanders or personal massaging devices is advantageous, as it reduces complexity and cost.

In another aspect of the present invention, a blade assembly is attachable to an OEM platen for a sheet sander or personal massaging devices.

In another aspect of the present invention, the cutting assembly includes a platen and a removable saw blade attachable to the platen, as part of a motorized tool with elliptical or orbital movement, similar to the movement employed by electric sheet sanders or personal massaging devices.

In the foregoing aspects, at least one guide pin, preferably having a tapering end for piercing a material, does not vibrate with the platen, but is connected to the tool body. The pin stabilizes the tool body so that kinetic energy from the motor is transferred to the cutting edge while it is agitated through the material.

It will be appreciated by those of ordinary skill in the art that the saw blade of the particular depicted embodiments can possess any number of teeth and any tooth profile including flat top teeth, combination teeth, alternate top bevel teeth and high alternate top bevel teeth. Set of the teeth can vary. The teeth can be alternately offset and possess an alternating side rake as well. Gullet dimension and kerf size can vary. The material of the blade can be carbon steel, carbide tipped, hardened steel or any material suited for material removal by cutting, piercing or sawing. Conceivably, the present invention can be adapted to use sanding, milling, piercing and grinding means as part of an agitating cutter.

The foregoing and other objects, features, and advantages of the invention will become more apparent from the following detailed description, which proceeds with reference to the accompanying figures wherein the scale depicted is approximate.

BRIEF DESCRIPTION OF THE DRAWINGS

FIG. 2 is an exploded view showing a rectangular blade 210 and blade coupling plate 214;

FIG. 3 is a bottom perspective view of blade 210, showing lip 211;

FIG. 6 is a plan view of one side of blade coupling plate 214;

FIG. 7 is a plan view of the blade coupling plate when nested within blade 210;

DETAILED DESCRIPTION OF THE INVENTION

Figure 1:
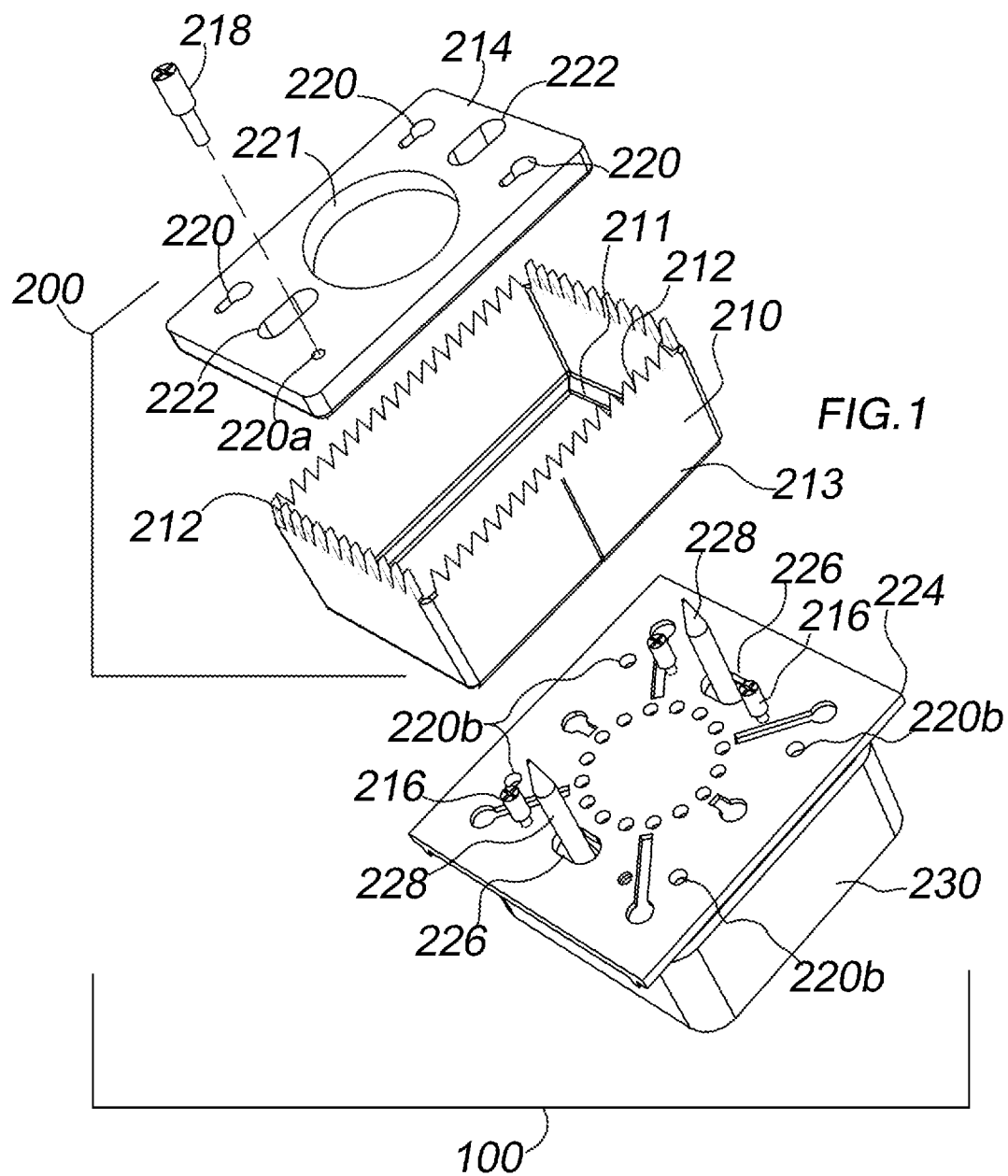
FIG. 1 is an exploded view of one embodiment of the present invention.

Reference Listing 100 material removal system
200 blade assembly
210 blade
211 blade lip
212 cutting edge
213 non-toothed portion
214 blade coupling plate
216 securing studs
218 locking fastener
220 securing apertures
220a fastener aperture
220b fastener aperture—platen
220c platen securing aperture
220d platen securing fastener
221 dust collection aperture
222a guide pin apertures
223 flange
224 platen
226 platen apertures
228 guide pins
230 mechanical linkage housing
231 spacer guides
232 guide pin support plate
233 offset bushing
234 bearing seat
236 mechanical movement

DEFINITIONS

In the following description, the term "material removal" refers to any material typically used in construction or manufacturing which includes, but is not limited to drywall, wall board, plaster board and cement composition board. The term "insert" refers to any inserted item whether an outlet box or other article. The term "outlet box" is used interchangeably with "electrical outlet box", or "electrical junction box." The term "motorized" means a fuel powered motor or an electric motor, not depicted in the disclosure. The term "platen" refers to the typically flat element of tools such as vibrating sanders an the like that is connected to the mechanical movement that agitates, vibrates or otherwise moves the platen which is pressed against a workpiece. The terms "move," "movement," "agitating movement" or "agitating motion" refer to any orbital, pseudo-orbital, elliptical, oscillating or vibratory movement. It does not refer to linear reciprocating movement—back and forth motion, or so called random orbital movement common to hand held sanders and some personal massaging devices in which the pad or disc is spinning and simultaneously moving in an elliptical path. The term "substantially gapless" refers to the blade of the disclosure, and more specifically to the back of the blade into which teeth are formed having no gaps or only very small gaps at the bends or corners of no more than 3 mm. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1 through 12c, a material removal system 100 enabling the installation of electrical outlet boxes, junction boxes and other inserts into drywall and other material, includes a platen 224 attached to an agitating movement 236 inside of housing 230, a serrated blade 210 of rectangular profile attaches to the platen via blade coupling plate 214. Studs 216, 218 are attached to platen 224 at one end, and at the other end attach to coupling plate 214 via apertures 220 in order to secure blade 210 to the platen. The platen is agitated by a motor driven offset bushing 233 which fits within bearing seat 234 formed on the underside of platen 224. Blade securing apertures 220 while depicted as having a keyhole shape in FIG. 1, can be other shapes suitable for coupling with studs 216, 218. Stud 218 is a locking fastener of similar design to securing studs 216 and passes though aperture 220a of the coupling plate, and threads into aperture 220b of the platen to secure the blade assembly and platen together in a sandwiched arrangement. Two guide pins 228 with tapering ends emerge from the linkage housing 230 which does not move with the platen. The pins are used to target a cut, pierce the material being worked and stabilize tool body so that energy is transferred to the blade as it vibrates though the material during the cutting process.

Turning to FIG. 1, an exploded view shows a preferred arrangement for the various components of one embodiment of the present invention. At the bottom is a housing for mechanical linkage 230 that contains an eccentric cam causing platen 224, to move. Platen 224 is attached to spacer guides 231 which move in concert with the platen when fasteners 220d are threaded into apertures 220c. Blade 210 of the particular embodiment depicted has a rectangular cutting profile. To install the blade assembly, blade coupling plate 214 is placed inside of blade 210 to nest against lip 211. The blade and coupling plate are together placed over the platen so that studs 216 pass through the larger portions of the apertures 220 and the blade assembly is then slid so that the larger radius portions of the studs are over the smaller radius portions of apertures 220. Fastener 218 is then placed successively through apertures 220a and 220b in order to secure the components together. Guide pins 228 pass thorough apertures 226 and 222, which are shaped and sized to permit the platen and the coupling plate to agitate without interference from the guide pins. While apertures 226 and 222 are depicted as elongate in FIG. 1, or circular in FIG. 6, the size and shape is dependent on the particular path of the platen which varies according to the mechanical movement. While preferably coupling plate 214 is used to join blade 210 to platen 224, flanges 223 with apertures such as that shown in (FIG. 12c) may be formed in the blade for the reception of locking fasteners that couple the blade to the platen. FIG. 2 shows the relative position of each blade assembly component. FIG. 3 shows the inwardly formed lip 211 of blade 210.

While blade 210 is preferably continuous, it may be a single blade that is bent or formed to the desired shape or comprised of multiple joined blades by seam welds or other joining means appreciated by those having skill in the art and benefit of this disclosure. It should be noted that among the many benefits accruing to the continuous blade structure is the tendency to the continuous blade to trap dust and loose material of the cutting process and deposit the loose material within the cutting space when the cutter passes through the material to be cut. This greatly reduces any clean up required after the cutting operation.

Figure 4:
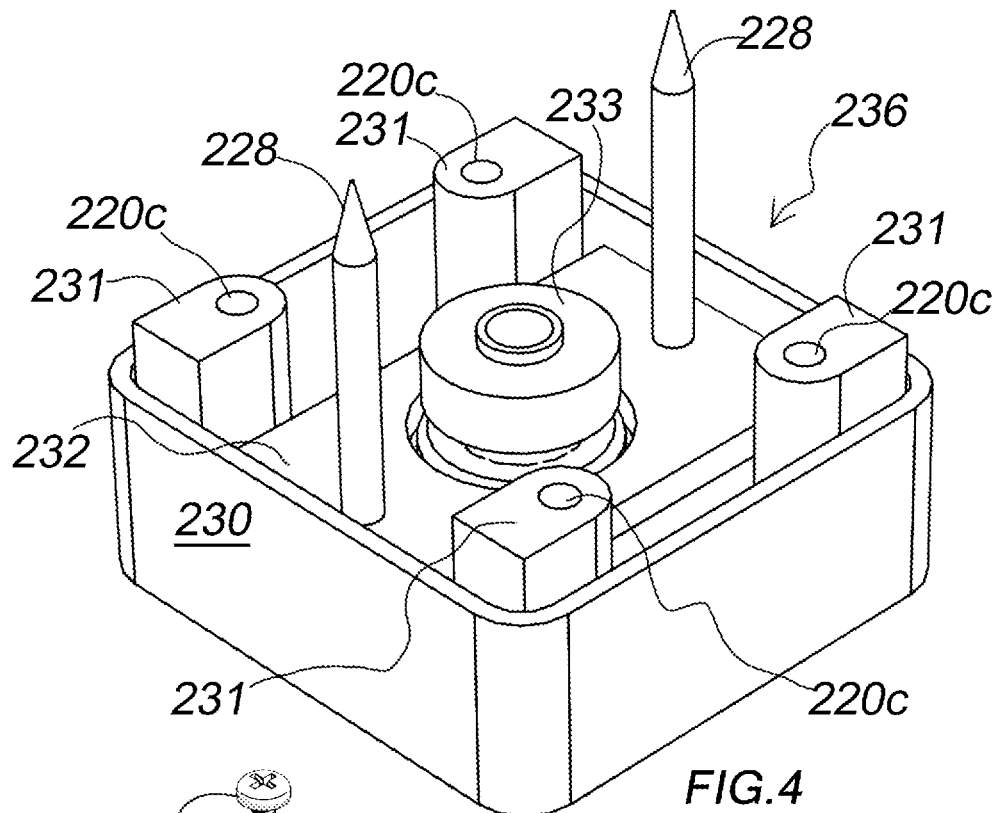
FIG. 4 shows the mechanical linkage inside housing 230 with platen removed.
Figure 5:
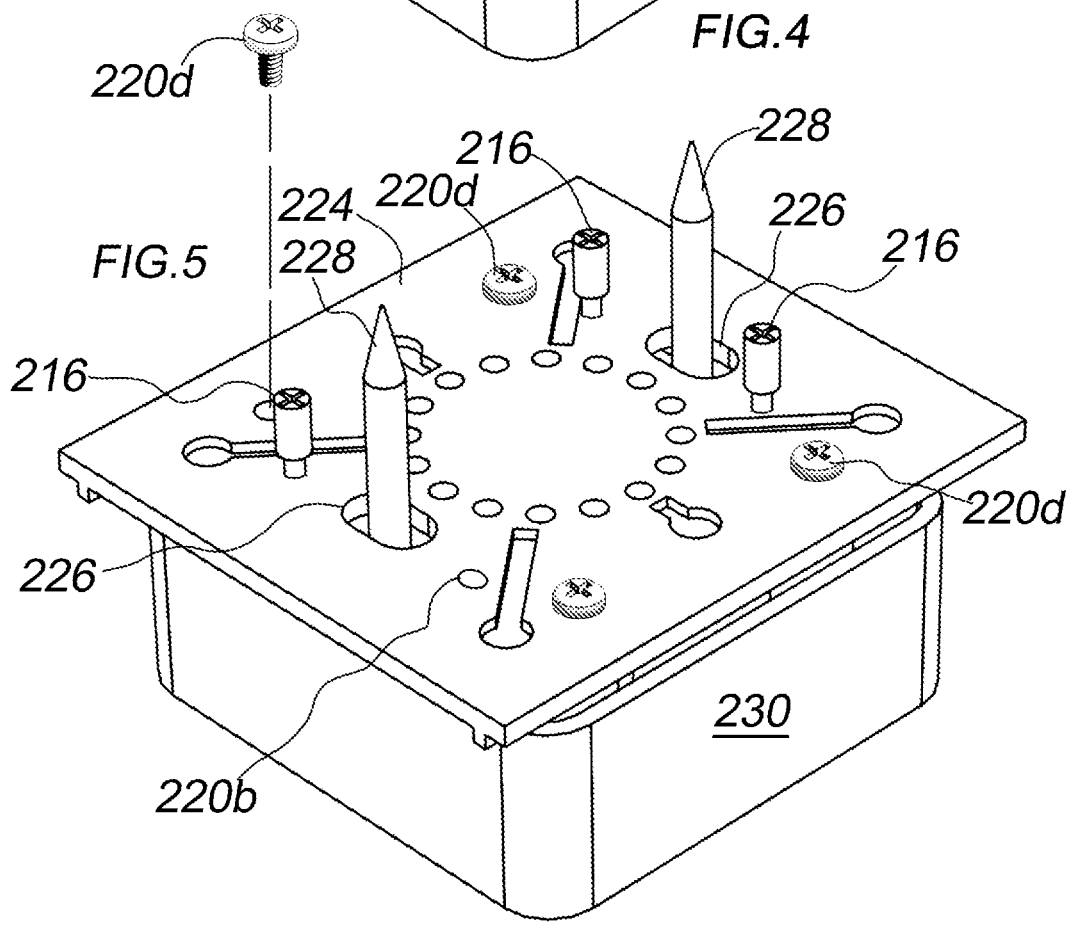
FIG. 5 is an isometric view of a mechanical linkage housing 230 with attached platen 224.

FIGS. 4 and 5 show respectively, mechanical linkage housing 230 without and with attached platen 224. In FIG. 5, securing studs 220d are shown being threaded through apertures 220b of the platen and into the apertures 220c of the spacer guides 231. The spacer guides are generally u-shaped assemblies having a portion of their length beneath the guide pin support plate 232 where they are loosely held. For example, the two spacer guides to the left of the housing are connected beneath support plate 232 which is connected to housing 230. Guide pins 228 extend from support plate 232 through which offset bushing 233 passes.

FIGS. 6 and 7 show respectively a top plan view of the blade coupling plate and a bottom plan view of the coupling plate showing apertures 220 and guide pin apertures 222.

Figure 8:
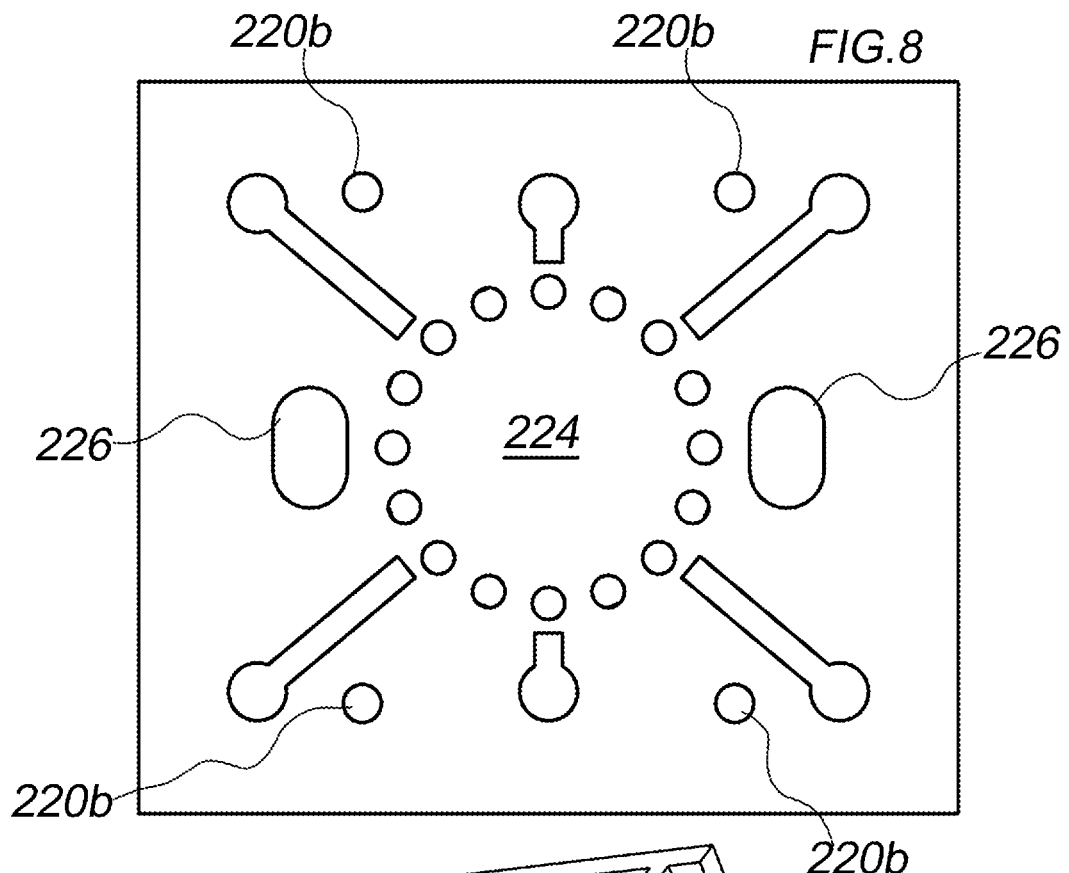
FIG. 8 is a top plan view of the platen of (FIG. 5)
Figure 9:
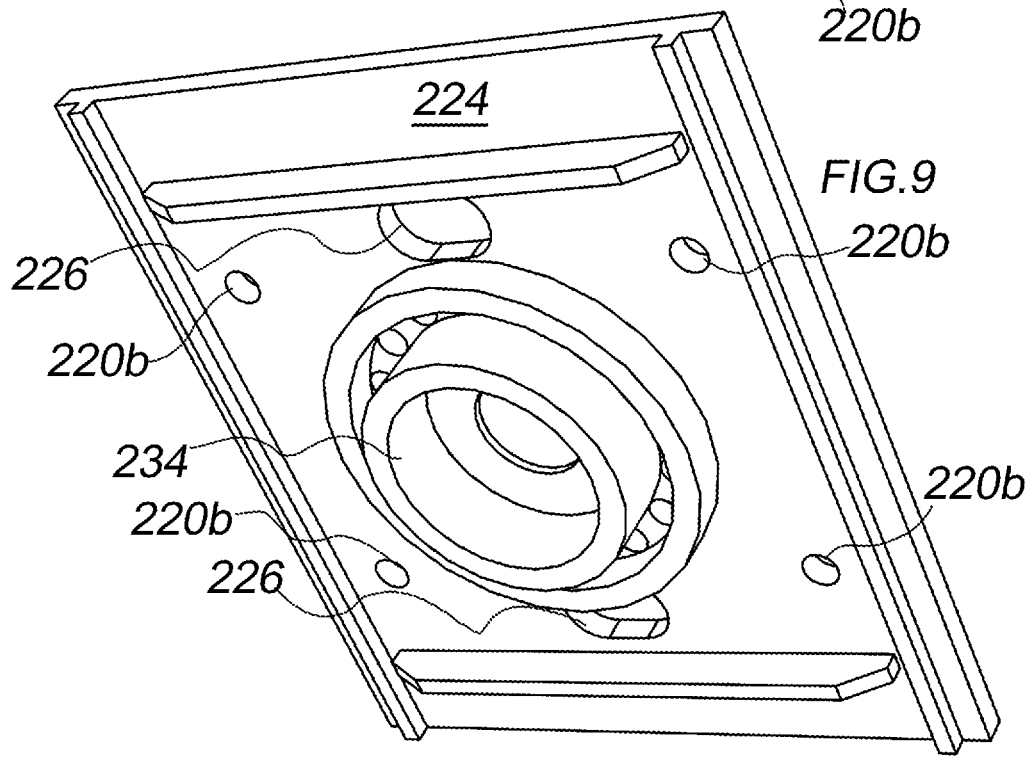
FIG. 9 is a bottom up perspective view of the platen of (FIG. 8)

FIGS. 8 and 9 show respectively, a plan view of the platen 224 showing guide pin apertures 222 and a bottom up perspective view showing a bearing recess, and apertures for the securing studs.

Figure 10:
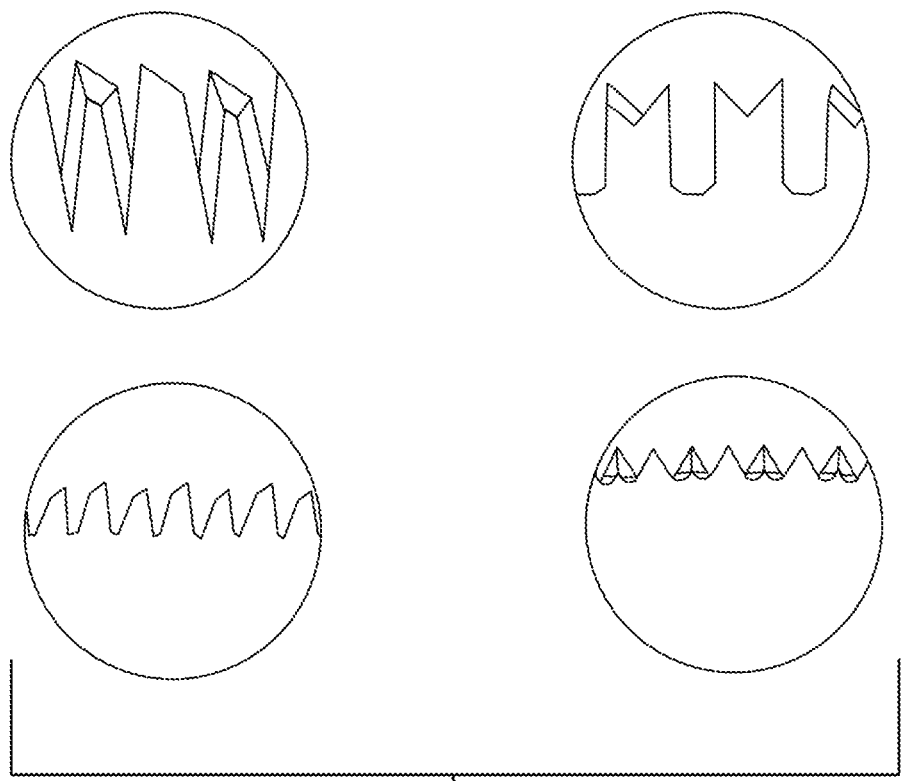
FIG. 10 depicts a number of exemplary saw tooth profiles.

FIG. 10 depicts a number of exemplary tooth configurations for blade 210 for the vibratory cutting of various materials and should be considered non-limiting. Other tooth profiles will suggest themselves to those having skill in the art and benefit of this disclosure.

Figure 11:
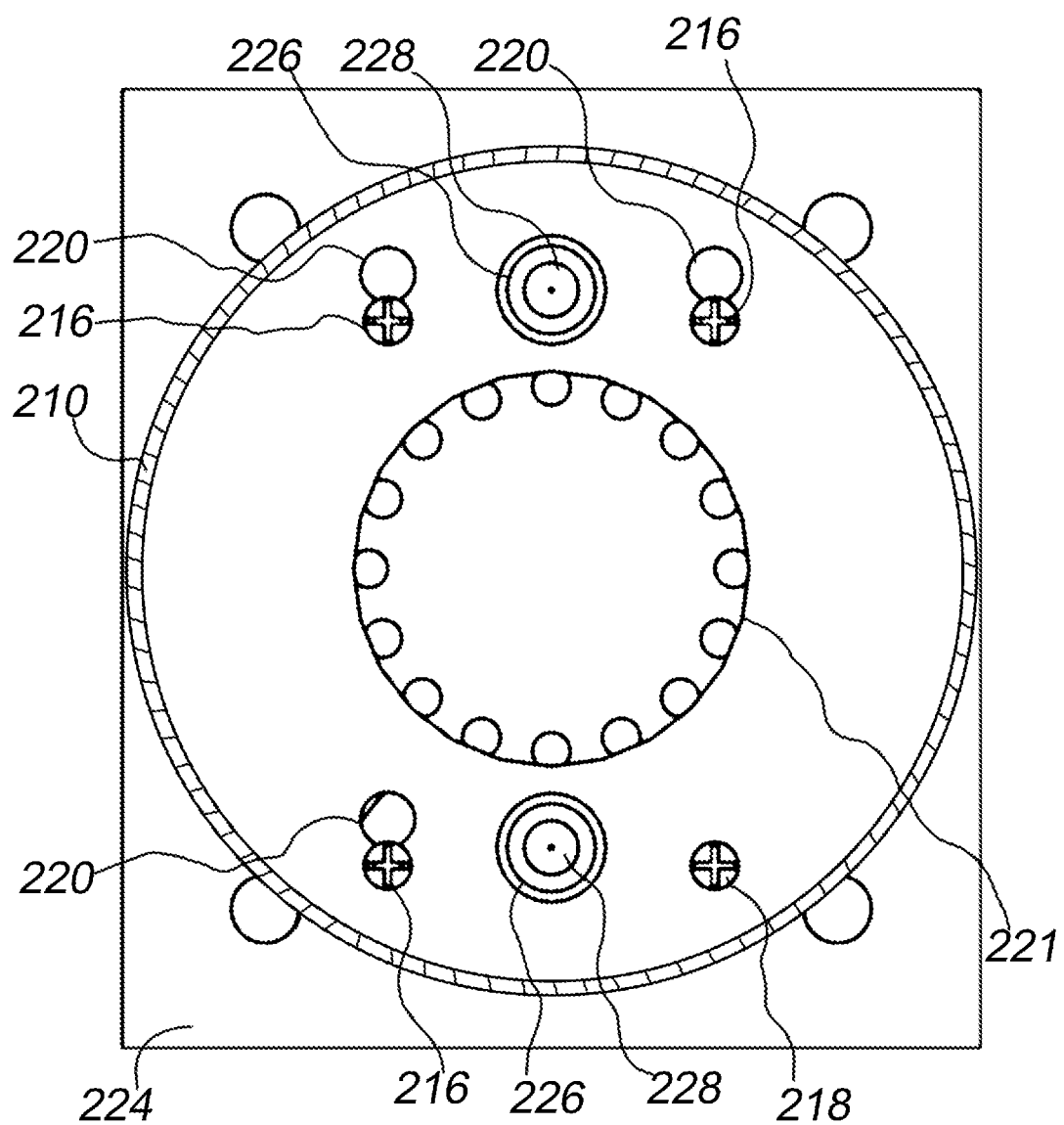
FIG. 11 depicts a bottom facing plan view of one embodiment according to the present invention with a cylindrically shaped blade.

FIG. 11 is a bottom plan view of another embodiment according to the present invention, here shown with a cylindrical blade 210 for cutting circles. The blade has a lip or flanged projection (not shown) like the rectangular blade previously depicted and is attached to the platen 224 in the same way as the rectangular blade, however, with a circular blade coupling plate 214.

Figure 12A:
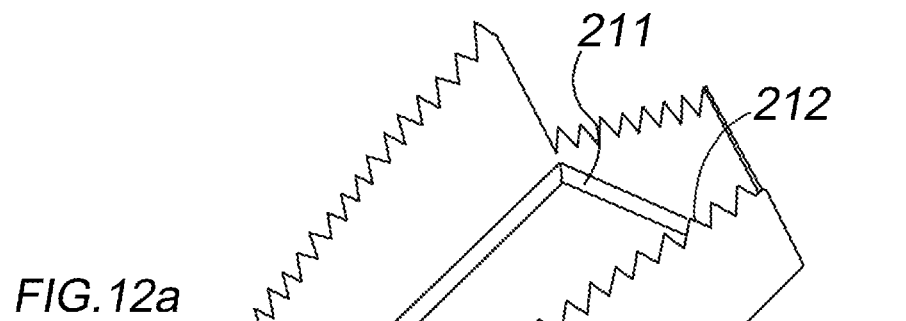
FIGS. 12a and 12b depict other embodiments with a tapered blade configuration and a arched blade configuration.
Figure 12B:
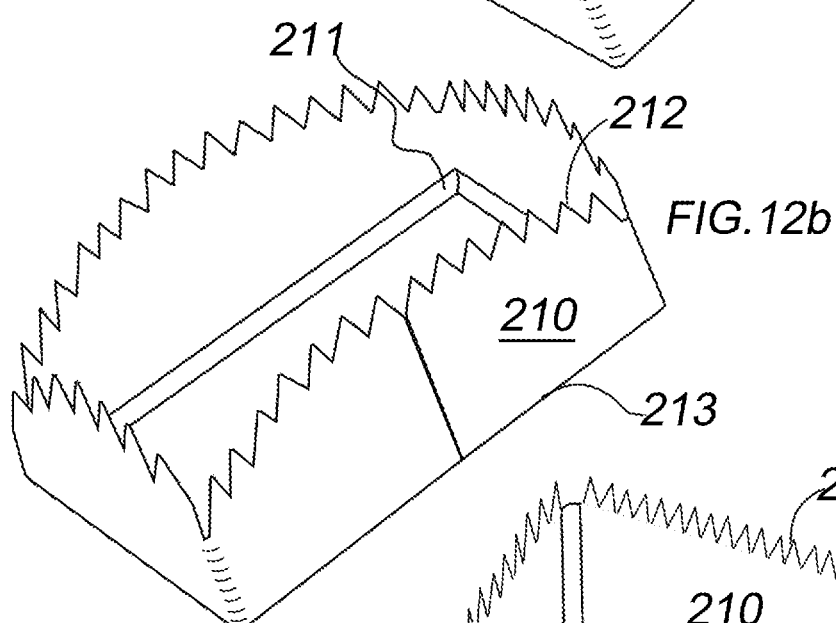
Figure 12C:
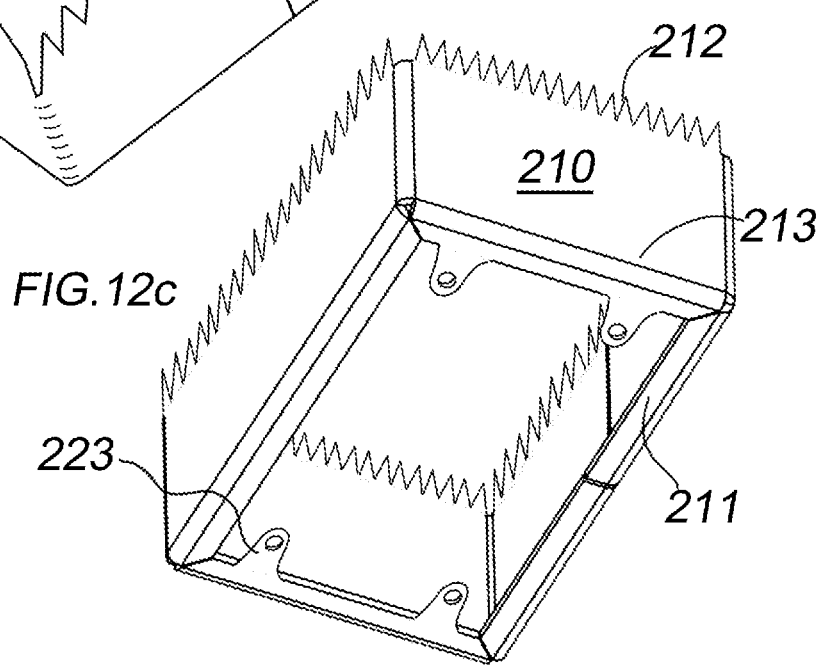
FIG. 12c is an alternate embodiment according to the present invention wherein blade 210 has flanges 223 with fastening apertures for attaching the blade directly to platen 224.

FIGS. 12a and 12b show blade 210 with tapered and outwardly curved cutting edges wherein kinetic energy is concentrated on a smaller region of the blade when it is initially plunged into a material.

It should be understood that the drawings and detailed description herein are to be regarded in an illustrative rather than a restrictive manner, and are not intended to be limiting to the particular forms and examples disclosed. For example, a dust gathering system with or without containment similar to those already used with sanding tools can be added without departing from the scope of the present invention. The addition of a light, level, depth indicator or stud locator in any combination can be added without departing from the scope of the invention. The configuration of a handle, handhold or grip for manipulating the tool can be of any design and can be for one or two-handed operation. It is also conceivable that the disclosed hole cutting system may be integrated with a robotic hole cutter. Likewise, persons having skill in the art will appreciate that modifications to OEM platens may be made to make use of particular makes and models of sheet sanders or other tools without departing from the instant invention. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A material removal system enabling the installation of inserted objects such as electrical outlet boxes and junction boxes into a material, comprising:
   (1) a housing for a motorized agitating movement having an agitation path;
   (2) a platen connectable to the motorized agitating movement;
   (3) a single blade assembly having a toothed edge, and opposite the toothed edge, a non-toothed portion which is removably attachable to the platen wherein the single blade has a continuous cutting edge configured to remove a cylindrical or non-cylindrical shaped section from the material, and wherein the motorized agitating movement is configured to agitate the toothed edge and the non-toothed portion of the single blade assembly in unison along the agitation path; and,
   (4) at least one piercing guide for piercing the material which extends from the housing for guiding and stabilizing the housing so that kinetic energy from the motor is transferred to the cutting edge when it is plunged into the material.

2. The system according to claim 1, in which the blade's cutting edge and non-toothed portion is substantially gapless.

3. The blade assembly according to claim 1 further comprising a blade coupling means whereby the blade and platen are secured together.

4. The system according to claim 1, in which the blade assembly is interchangeable with a differently shaped or sized blade assembly.

5. The system according to claim 1 further comprising oscillating mechanical movement.

* * * * *